(12) United States Patent
Arnot

(10) Patent No.: US 10,491,785 B1
(45) Date of Patent: Nov. 26, 2019

(54) INTERCHANGEABLE MEDIA PROMPTING ASSEMBLY AND METHOD FOR PROMPTING

(71) Applicant: Robert S. Arnot, Ashland, OR (US)

(72) Inventor: Robert S. Arnot, Ashland, OR (US)

( * ) Notice: Subject to any disclaimer, the term of this patent is extended or adjusted under 35 U.S.C. 154(b) by 133 days.

(21) Appl. No.: 15/942,522

(22) Filed: Mar. 31, 2018

Related U.S. Application Data

(60) Provisional application No. 62/482,342, filed on Apr. 6, 2017.

(51) Int. Cl.
  *H04N 5/222* (2006.01)
  *G02B 27/14* (2006.01)

(52) U.S. Cl.
  CPC .......... *H04N 5/2222* (2013.01); *G02B 27/14* (2013.01)

(58) Field of Classification Search
  CPC .............................. H04N 5/2222; G02B 27/14
  See application file for complete search history.

(56) References Cited

U.S. PATENT DOCUMENTS

| | | | |
|---|---|---|---|
| 5,194,955 A * | 3/1993 | Yoneta | G02B 27/2292 348/14.01 |
| 5,721,586 A | 2/1998 | Shimamura et al. | |
| 6,104,424 A | 8/2000 | McNelley | |
| 6,280,039 B1 * | 8/2001 | Barber | G03B 17/17 348/375 |
| 6,670,985 B2 | 12/2003 | Karube et al. | |
| 6,717,619 B2 | 4/2004 | Wasada | |
| 6,980,253 B1 | 12/2005 | Matsui | |
| 8,350,960 B2 | 1/2013 | DeOtte | |
| 8,899,757 B2 | 12/2014 | Williams, IV | |
| 8,902,355 B2 | 12/2014 | Dudkowski | |
| 9,013,629 B2 | 4/2015 | Vito | |
| 9,030,603 B1 | 5/2015 | Vito | |
| 9,118,824 B2 | 8/2015 | Vito et al. | |
| 2009/0256970 A1 | 10/2009 | Bilbrey et al. | |
| 2011/0298935 A1 * | 12/2011 | Segal | H04N 5/265 348/207.1 |
| 2014/0247497 A1 | 9/2014 | Giraldo | |
| 2017/0064158 A1 | 5/2017 | Arce | |

* cited by examiner

*Primary Examiner* — Twyler L Haskins
*Assistant Examiner* — Angel L Garces-Rivera
(74) *Attorney, Agent, or Firm* — Jerry Haynes Law

(57) ABSTRACT

A media prompting assembly enables various input sources to prompt images and text onto a beam splitter mirror with minimal light reflections. The assembly provides at least one interchangeable camera to capture the image from a user; a housing comprising sidewalls and an interchangeable camera panel that encloses the screen and the beam splitter mirror, the camera panel defined by a lens hole that is positioned and sized for operation with a correlating camera; an electronic device provides an image signal to a monitor, the monitor further comprises an internal mirror flip circuit that creates a mirror image of the signal to be projected from the monitor screen; and a beam splitter mirror adjustable and in front of the viewer inside the housing to reflect the image from the screen correctly oriented and readable by the user, so that a user may look directly into a camera when addressing an audience.

20 Claims, 15 Drawing Sheets

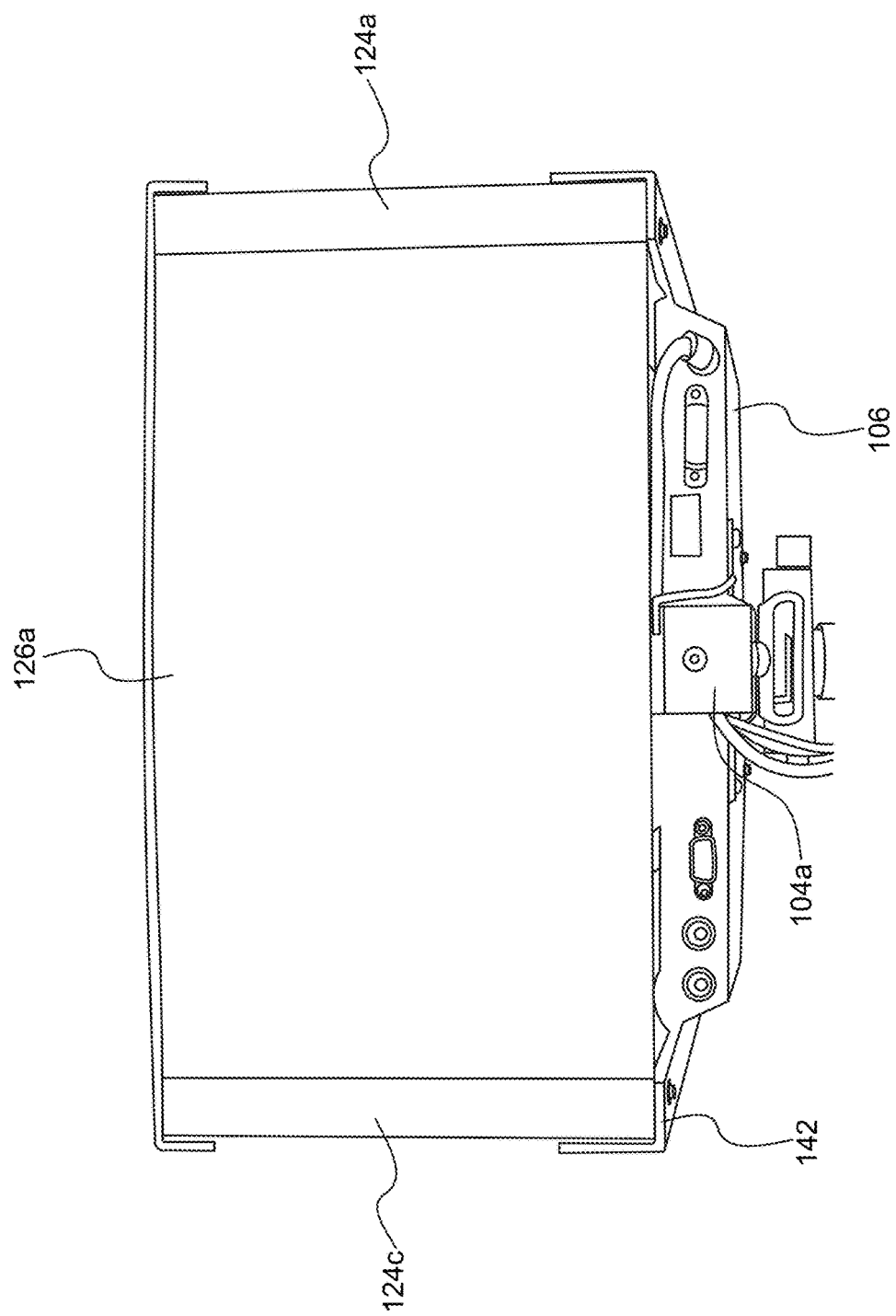

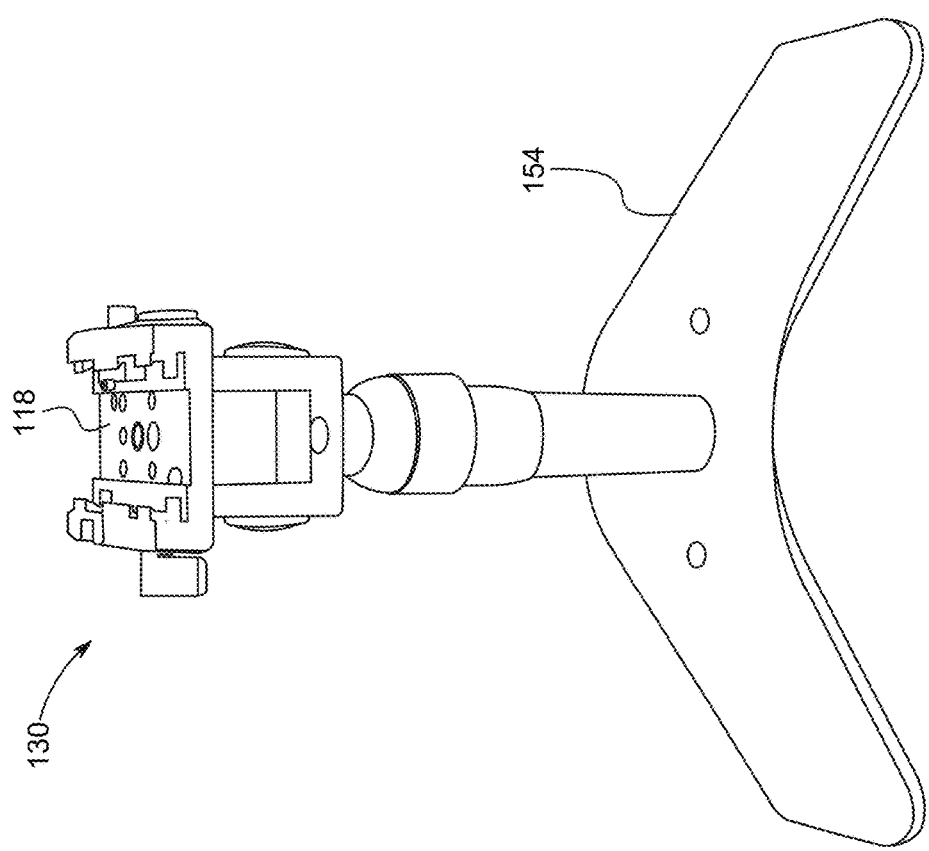

INTERCHANGEABLE MEDIA PROMPTING ASSEMBLY AND METHOD FOR PROMPTING

CROSS-REFERENCES TO RELATED APPLICATIONS

This application claims priority from U.S. Provisional Application Ser. No. 62/482,342, entitled "Interchangeable Media Prompting Assembly and Method for Prompting", filed on Apr. 6, 2017, which application is hereby incorporated herein by reference in its entirety.

FIELD OF THE INVENTION

The present invention relates generally to a media prompting assembly and method for prompting. More so, the present invention relates to a method for prompting and a prompting assembly that enables mounting various types of interchangeable cameras by using one or more correlating camera stand and interchangeable camera panels.

BACKGROUND OF THE INVENTION

Generally, prompting devices are electronic display devices that prompt a user (e.g., actor or user or presenter or performer) with a script to be read for various activities, such as video recordings and public speaking. The screen is in front of, and usually below, the lens of a professional video camera, and the words on the screen are reflected to the eyes of the user using a sheet of clear glass or a specially prepared beam splitter. Light from the user passes through the front side of the glass into the lens, while a shroud surrounding the lens and the back side of the glass prevents unwanted light from entering the lens of the camera.

Because the user does not need to look down to consult written notes, the teleprompter creates the illusion that the user has memorized the speech or is speaking spontaneously, looking directly into the camera lens.

Numerous innovations have been provided in the prior art that are adapted to an electronic prompting device such as a teleprompter. Even though these innovations may be suitable for the specific purposes to which they address, however, they would not be as suitable for the purposes of the present invention.

For example, U.S. Pat. No. 5,721,586 to Shimamura et al. discloses a prompter for a TV camera comprising a support plate swingably supporting a half mirror, and a light shield for shielding the half mirror. When the half mirror is inclined by 45° to its operating position, the image of the manuscript is displayed on the half mirror. In retracting, the half mirror is moved to the retracted position and the light shield can be folded.

U.S. Pat. No. 6,104,424 to McNelley teaches a video conferencing eye contact folded optic apparatus for mounting to an existing display monitor which permits in a first position the capturing of eye contact images of a conferee for transmission to a distant terminal and in a second position permits the conferee to have direct access to a viewing screen.

U.S. Pat. No. 6,670,985 to Karube et al. discloses an image sensing apparatus comprising a camera being detachably connected to a computer for entering a moving or still picture into the computer via an extension card capable of being inserted into and withdrawn from the computer. The video camera comprises an optical lens unit and a solid-state area sensor.

U.S. Pat. No. 6,717,619 to Wasada describes a prompter system, comprising a mount plate attached to a pan head, a television camera detachably mounted on the mount plate; and a prompter body that displays a script image for a person to whom the television camera is aimed, the prompter body being detachably mounted on the mount plate in front of the television camera.

U.S. Pat. No. 6,980,253 to Matsui describes a prompter having a bi-divisional structure comprising a first support stage on which an LCD and a semitransparent mirror are supported and a second support stage on which a video camera is supported. The second support member is slideable to overlap with a top face of the first support member, and the mirror is foldable onto the second support member.

U.S. Pat. No. 8,350,960 to DeOtte describes a collapsible prompting device having a frame, a plurality of reflective panes, and support members and may be used on a desktop by a home or small business user to read a script in a natural manner while speaking to a camera or other video capturing device. A collecting pane reflects an image onto a viewing pane, so as to create a displayed image which may be viewed by a user. The viewing pane is generally transparent allowing a user to be recorded or photographed through the viewing pane.

U.S. Pat. No. 8,899,757 to Williams, IV describes a portable video production system that includes a stand, a prompter portion, a mirror, a piece of glass, and a measuring device. The mirror is configured to reflect a display of a laptop. The piece of glass reflects the reflection of the display from the mirror to provide a reflected image to the user and to enable a video to be filmed through the glass without the reflected image appearing in the video. The measuring component indicates a first distance for the user to stand from the system.

U.S. Pat. No. 8,902,355 to Dudkowski describes a prompting system that includes a see through mirror, a housing, and LCD display. The housing has an open front, two opposite shrouding walls, a shrouding bottom, and a rear shrouding wall. The see through mirror is semitransparent, which is securely held in position at a 45 degree angle to the screen surface of the LCD display. The rear shrouding wall has a round opening, or called through-hole, for placing the camera's lens for video recording.

U.S. Pat. No. 9,030,603 to Vito describes a collapsible prompting apparatus comprising a foldable prompting box defining a space for housing a two-way see-through mirror and the lens of the camera. The pre-designed text is displayed on the tablet device's screen at a speed that the user feels comfortable to read.

U.S. Pat. No. 9,118,824 to Vito et al. describes a prompting apparatus comprising a prompting box and a mounting and adjusting assembly. The prompting box houses a two-way mirror and the lens of the camera. The prompting box includes a shell frame and a coupling means which enables a user to slide in a tablet device. The tablet device runs a prompting software application and the pre-designed text is displayed on the screen at a speed that the user feels comfortable to read.

U.S. Pat. Application No. 20090256970 to Bilbrey et al. describes a teleprompter that allows for rapid adjustment of the camera position and height, beam splitter mirror assembly height and angle, tripod mounting, as well as additional accessories including counter weights, shoulder pads, batteries and feedback monitors. Further the teleprompter comprises a second, lower plane of contact for mounting heavier cameras.

U.S. Pat. Application No. 20140247497 to Giraldo describes a computing device display device comprising a first optical element with a reflective surface to reflect content of the computing device and a second optical element that includes a beam splitting surface to receive a reflection from the first optical element as part of a head-up display setup for the user. A hood is used to prevent a portion of ambient light from reaching the first optical element and the second optical element.

U.S. Pat. Application No. 20170064158 to Arce describes a teleprompter system that comprises a handheld camera, a lens coupled to the handheld camera, a teleprompter removably coupled to the lens and a mobile device removably coupled to the teleprompter.

It is apparent now that numerous innovations that are adapted to a teleprompter system have been developed in the prior art that are adequate for various purposes. Furthermore, even though these innovations may be suitable for the specific purposes to which they address, accordingly, they would not be suitable for the purposes of the present invention as heretofore described. Thus a media prompting assembly having an interchangeable camera panel to mount one or more interchangeable cameras by using one or more correlating camera stands and a method for prompting by using the assembly is needed.

SUMMARY OF THE INVENTION

The present invention relates to a prompting assembly that enables various types of input devices to efficiently prompt images and text onto a screen with minimal external reflections, so that a user may look directly into the camera rather than at notes or other off-camera information, when addressing an audience or individual; whereby the prompter assembly provides: at least one interchangeable camera to capture the image from the user; a housing comprising at least one sidewall and an interchangeable camera panel that are matted and enclose the screen and the beam splitter mirror, the interchangeable camera panel with or without a hole as defined by the correlating camera; a screen that projects an image, and the screen further comprises an internal mirror flip circuit that creates a mirror image of the image being projected from the screen, i.e., scrolling text, pictures, webinar software, video conferencing, etc., so that the image is correctly oriented and readable when reflected on a beam splitter mirror; and the beam splitter mirror is adjustable and secured inside the housing to reflect the image from the screen for viewing by the user.

According to an aspect of the present invention, a media prompting assembly comprising: a monitor configured to receive an image signal from an electronic device, further a metal frame encloses the at least left side, right side, and bottom surfaces of the monitor; one or more L-shaped support brackets attached to the metal frame of the monitor, wherein the L-shaped support brackets are configured to run parallel to the left side and the right side surfaces of the monitor; a beam splitter mirror, wherein a mirror frame protects the beam splitter mirror and provides a framework for pivotally attaching mirror to the monitor by means of the L-shaped support bracket; a housing comprising a left sidewall, a top sidewall, and a right sidewall mate with an interchangeable camera panel to form a generally cuboid shape with an open face, whereby the housing is matted and configured to enclose the screen and the beam splitter mirror, the left sidewall and the right sidewall are detachably attached in a vertical position to the L-shaped support brackets, further the left sidewall and the right sidewall are configured to detachably and pivotally retain the beam splitter mirror at a 45° angle relative to the screen when the mirror is moved from a flattened stowage position to an inclined operational position; a height adjustable stand having a quick release mounting bracket for securing to a quick release plate attached to the metal frame of the monitor, so as to support the assembly in a desired position; a camera stand mounting bracket attaches to the metal frame of the monitor, wherein the camera stand mounting bracket provides a mounting surface for an interchangeable adjustable camera stand; and at least one camera to be interchangeably used and retained with the camera stand, whereby the camera is positioned behind center of the beam splitter mirror while facing the user, the camera stand and the camera panel are interchangeable with respect to the camera, wherein lens hole size on the camera panel depends on the size of the camera lens and position of the camera, whereby the monitor comprising a screen and an internal mirror flip circuit that creates a mirror image of the received image signal that is projected from the screen to create a correctly oriented image, which is readable, when reflected on the beam splitter mirror disposed at a predetermined angle relative to the screen, thereby directly displaying the correctly oriented readable image in front of the user for viewing, simultaneously allowing the camera to capture video of the user.

In view of the foregoing, it is therefore an objective of the present invention to enable three or more types of cameras to operate with the assembly.

Another objective is to minimize glaring lights with an enclosing housing having a black colored matted surface.

Another objective is to interchange the camera panels, camera stands, and cameras to quickly change from a webinar using the webcam, to a Facebook live using a smart phone, or put the assembly on a tripod and record with a video camera.

Another objective is to provide an integrated desktop stand to support the assembly on a desk.

Another objective is to enable the camera, camera stands, monitor, and beam splitter mirror to also be used as an extended desktop monitor.

Another objective is to provide a quick release mounting bracket on the desktop stand that attaches to the quick release plate on the back side of the monitor to facilitate collapsing the assembly for stowage as well as allowing for easy movement of the assembly between a desktop environment and a video studio.

Another objective is to enable correctly oriented images for both text and pictures with an internal mirror flip circuit that creates a mirror image of the image signal such that all images on the beam splitter mirror are correctly oriented.

Another objective is to provide an inexpensive method to manufacture a prompting assembly capable of using multiple cameras interchangeably.

Other objectives and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which:

FIG. 2A shows the media prompting assembly in operation, FIG. 2B shows the assembly being used, simply as a standard teleprompter, FIG. 2C shows the assembly being used as a video conferencing system by the user to make direct contact with the eyes of an individual, and FIG. 2D shows the assembly allowing the user to view a correctly oriented desktop image from a computer or other media source while looking directly ahead at the camera, and FIG. 2E shows the assembly displaying a camera entertainment image that plays directly from the screen to the beam splitter mirror for viewing by the user as an exercise to develop improved performance as a user on camera, in accordance with an embodiment of the present invention;

FIGS. 8A and 8B illustrate perspective views of an exemplary webcam, where FIG. 8A shows the webcam mounted to a camera stand, and FIG. 8B shows a camera panel with no lens hole, in accordance with an embodiment of the present invention;

FIG. 9A shows the assembly comprising a camera panel that has a centrally located lens hole, and FIG. 9B shows the video camera/DSLR retained with a camera stand against the camera panel, in accordance with an embodiment of the present invention;

FIG. 10A shows the smart phone camera adapter mounted to a camera stand, and FIG. 10B shows the smart phone camera aligned with a camera panel that is defined by a protrusion mounted on the camera panel with a lens hole, in accordance with an embodiment of the present invention;

FIG. 11 illustrates a perspective view of an exemplary desktop stand for the assembly, in accordance with an embodiment of the present invention.

Like reference numerals refer to like parts throughout the various views of the drawings.

DETAILED DESCRIPTION OF THE INVENTION

Figure 1:
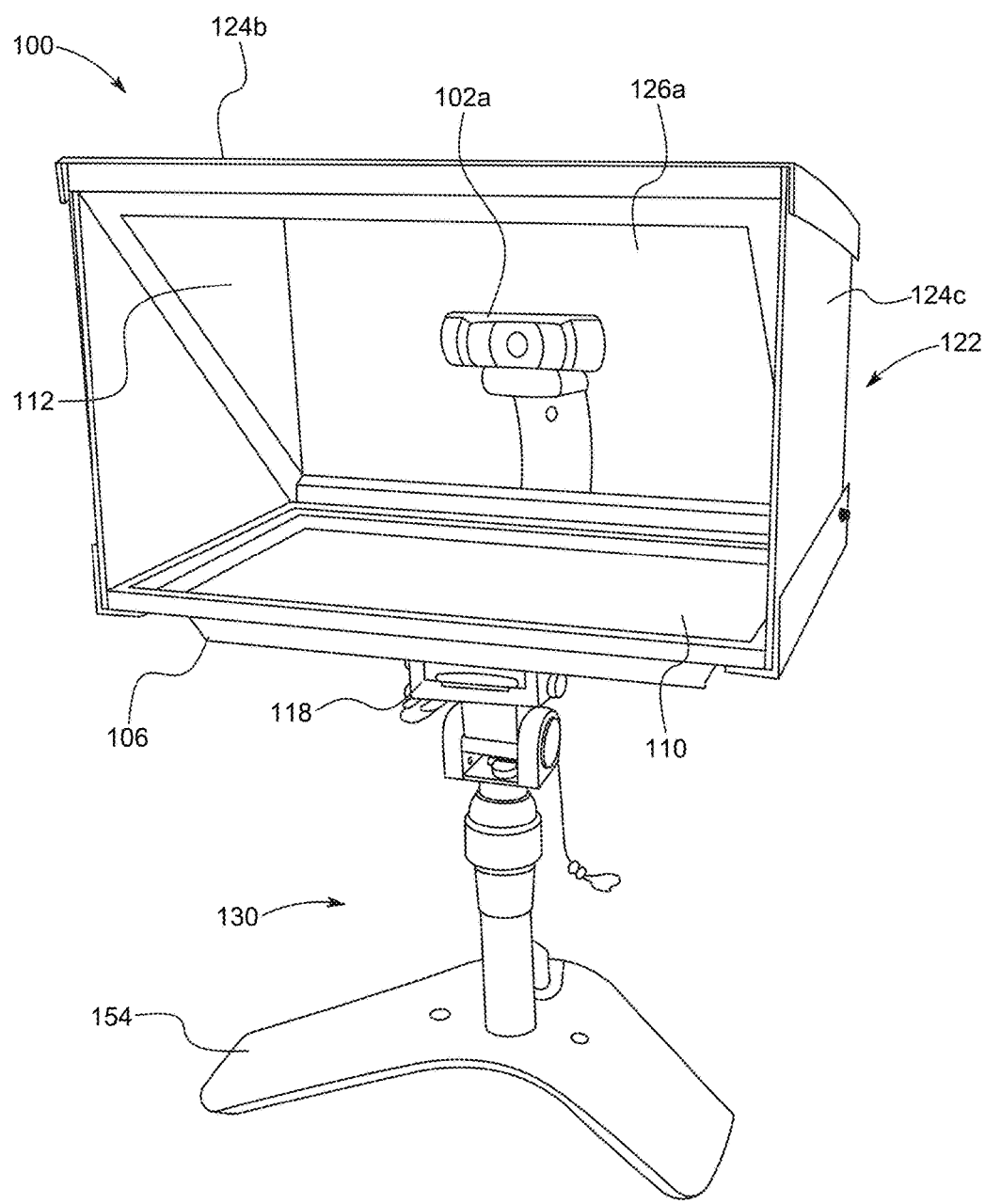
FIG. 1 illustrates a perspective view of an exemplary media prompting assembly, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A media prompting assembly 100 and method 200 for prompting is referenced in FIGS. 1-12. The media prompting assembly 100, hereafter "assembly 100" creates a unique interactive experience by allowing a user to look directly at different possible types of cameras 102a, 102b, 102c while being prompted with images and text from a screen 110 reflected onto a beam splitter mirror 112 in front of the user. The assembly 100 minimizes glares and reflection on a beam splitter mirror 112 from which the user looks at to view the images and text. The assembly is operable with different types and sizes of cameras and allows for quick, efficient interchangeability, so as to service different media needs. The assembly 100 is also collapsible for stowage and portability.

In this manner, the user may look directly into the camera 102a-c rather than at notes or other off-camera information, when addressing an audience or individual. Consequently, an illusion is created that the user has memorized the readable image, i.e., speech, or is speaking spontaneously because the user does not need to look down to consult written notes, but rather looks directly into the camera 102a-c.

Further, the assembly 100 allows for multiple types of cameras 102a-c and camera stands 104a-c to be used, and provides multiple camera panels 126a-c having a lens hole 128, when required, that correlates with their respective cameras 102a-c. The housing 122 of assembly 100 is also unique in that it completely encloses a screen 110 and a beam splitter mirror 112 inside at least one sidewall 124a-c and a camera panel 126a-c. This substantial enclosure minimizes glare and external lighting on the beam splitter mirror 112, where the readable image 152 is being viewed.

In some embodiments, the assembly 100 provides at least one camera 102a-c. The at least one camera 102a-c works to capture the image of the user. The at least one camera 102*a-c* may include, without limitation, a webcam, a video camera, a DSLR camera, and a smart phone video camera. The user looks into the camera 102*a-c* to deliver a presentation viewed from a screen 110 reflected onto a beam splitter mirror 112. The camera is operatively connected to a network, Internet, or local digital storage means that receives transmissions of the user's image.

In some embodiments, the assembly 100 provides a screen 110 that projects a reversed image 151. The screen 110 and the internal mirror flip circuit 108 are housed within the monitor 106. The internal mirror flip circuit 108 creates a reversed image 151 of the image signal 150 being sent from an electronic device or other media source 148 to the screen 110, i.e., scrolling text, pictures, webinar software, video calls, etc., so that the presentation 152 is readable and correctly oriented when reflected on a beam splitter mirror 112. In one embodiment, the screen 110 is a full HD (1920×1080) resolution 13.3" monitor; however other types and sizes of monitors may be used without departing from the scope and spirit of the present invention. The monitor 106 is basically an external monitor and is connected to a desktop, or more likely, a laptop computer or similar electronic or media devices 148. Thus applications like Zoom, Skype, PowerPoint, Webinar software, Teleprompter apps, etc., will operate exactly the same as if they are on the main computer screen. The monitor 106 can be controlled through a remote control device (not shown).

In some embodiments, the assembly 100 provides a beam splitter mirror 112 that is adjustable and secured inside the housing 122. The beam splitter mirror 112 is configured to reflect the correctly oriented readable image 152 from the screen 110 and display directly in front of the user for viewing. In essence, the beam splitter mirror 112 serves as a two-way mirror, whereby the beam splitter mirror 112 is placed at an angle to reflect the readable image being projected from the screen 110, allowing the user to look directly into the camera 102*a-c* rather than at notes or other off-camera information, when addressing an audience or individual.

In some embodiments, the assembly 100 provides a housing 122 comprising at least one sidewall 124*a-c* and a camera panel 126*a-c* to enclose the screen 110 and the beam splitter mirror 112. Additionally, sidewall 124*a-c* and camera panel 126*a-c* may be matted and black colored to minimize glare and reflections. Camera panel 126*b-c* forms a lens hole 128 that is positioned and sized for operation with a correlating camera 102*b-c*. Though in some embodiments, the camera panel 126*a* does not form a lens hole, depending on the type of camera 102*a* that is being operated with assembly 100.

According to one aspect of the present invention, a media prompting assembly 100 comprising: a monitor 106 configured to receive an image signal 150 from an electronic device 148, further the monitor 106 is enclosed by a metal frame 144; a beam splitter mirror 112, wherein the beam splitter mirror 112 is configured to pivotally attach to the frame 144 of the monitor 106; a housing 122 comprising a left sidewall 124*a*, a top sidewall 124*b*, and a right sidewall 124*c* mate with an interchangeable camera panel 126*a-c* to form the housing 122 with an open face, whereby the housing 122 is matted and configured to enclose the monitor 106 and the beam splitter mirror 112, further the housing 122 is configured to detachably and pivotally retain the beam splitter mirror 112 at a predetermined angle relative to the screen 110; a camera stand mounting bracket 158 attaches to the frame 144 of the monitor 106, wherein the camera stand mounting bracket 158 provides a mounting surface for an interchangeable adjustable camera stand 104*a-c*; and at least one camera 102*a-c* to be interchangeably used and retained with the camera stand 104*a-c*, whereby the camera 102*a-c* is positioned behind center of the beam splitter mirror 112 while facing the user, the camera stand 104*a-c* and the camera panel 126*a-c* are interchangeable with respect to the camera 102*a-c*, wherein lens hole size 128 on the camera panel 126*a-c* depends on the size of the camera lens and position of the camera 102*a-c*, whereby the monitor 106 comprising a screen 110 and an internal mirror flip circuit 108 that creates a mirror image of the received image signal that is projected from the screen to create a reversed image 151, which is readable when reflected on the beam splitter mirror, thereby directly displaying the readable image 152 in front of the user for viewing, simultaneously allowing the camera 102*a-c* to capture video of the user.

According to another aspect of the present invention, a media prompting assembly 100, comprises: at least one interchangeable camera 102*a-c* configured to capture a user image; at least one interchangeable camera stand 104*a-c* configured to support a correlating camera 102*a-c*; a monitor 106 configured to receive an image signal 150, the monitor 106 comprising a screen 110 and an internal mirror flip circuit 108 that creates a reversed image 151 of the image signal 150, and projects the reversed image 151 from the screen 110, such that the image on the beam splitter mirror 112 is correctly oriented and readable; a beam splitter mirror 112 disposed at an angle relative to the screen 110, the beam splitter mirror 112 configured to reflect the reversed image 151 from the screen 110 for viewing, whereby the reversed image 151 is correctly oriented and readable when reflected on the beam splitter mirror 112; a mirror frame 120 configured to support the beam splitter mirror 112; a housing 122 comprising at least one sidewall 124*a-c* and an interchangeable camera panel 126*a-c*, the at least one sidewall 124*a-c* and the interchangeable camera panel 126*a-c* being matted, the at least one sidewall 124*a-c* is configured to enclose the screen 110 and the beam splitter mirror 112, the at least one sidewall 124*a-c* further configured to adjustably retain the mirror frame 120 at the angle relative to the screen 110, the camera panel 126*b-c* defined by a lens hole 128 positioned and sized for enabling operation of at least one camera 102*b-c*, whereby one of each of at least one camera 102*a-c*, at least one camera stand 104*a-c*, and at least one camera panel 126*a-c* correlate; whereby each correlating group of camera 102*a-c*, camera stand 104*a-c*, and camera panel 126*a-c* are interchangeable with another correlating group of camera 102*a-c*, camera stand 104*a-c*, and camera panel 126*a-c*; and a desktop stand 130 configured to support the assembly 100.

In another aspect, at least one camera 102*a-c* includes at least one of the following: a webcam 102*a*, a video camera 102*b*, camcorder 102*b*, a DSLR camera 102*b*, and a smart phone video camera 102*c*.

In another aspect, at least one camera stand 104*a-c* is selected from the group correlated to the at least one camera 102*a-c*.

In another aspect, the screen 110 comprises a full HD (1920×1080) resolution 13.3" screen.

In another aspect, the monitor 106 comprises at least one threaded hole 116 to enable attachment to at least one L-shaped support bracket 142.

In another aspect, the angle of the predetermined angle of the beam splitter mirror 112 relative to the screen is 45° when the mirror 112 is moved from a flattened stowage position to an inclined operational position.

In another aspect, a pivot point for the beam splitter mirror frame 120 is a screw and flange bearing 156 passing through a hole in the at least one L-shaped support bracket 142 and through a hole at the lower region in the at least one sidewall 124a, 124c.

In another aspect, the beam splitter mirror 112 is defined by at least one peripheral support frame 120.

In another aspect, the assembly 100 further comprises a set screw 114 configured to fasten the mirror frame 120 to the sidewall 124a, 124c through the at least one peripheral hole.

In another aspect, the mirror frame 120 is constructed from picture frame material.

In another aspect, the housing 122 is constructed from laser cut and heat bent acrylic sheets, which are matted and black colored to minimize glare and reflections.

In another aspect, the assembly 100 is configured to collapses to a package of about 3 inch thick, 13.5 inch wide by 12 inch deep, though other configurations of the assembly may be used without departing from the scope of the present invention.

In another aspect, the desktop stand 130 is a modified LCD monitor stand.

In another aspect, the assembly 100 further comprises a height adjustable stand 130 having a quick release mounting bracket 118 for securing to a quick release plate 146 attached to the frame 144 of the monitor 106, so as to support the assembly 100 in a desired position.

In another aspect, the beam splitter mirror 112 is selected from the group consisting of a dichroic mirror, a teleprompter mirror, a coated mirror, a one-sided mirror and the like.

In another aspect, the assembly 100 further comprises an external microphone (not shown) for receiving sound input.

In another aspect, the mirror frame 120 is protected by foam core pads 162 during stowage in the flat, collapsed position.

In another aspect, a method 200 for prompting with a media prompting assembly 100, the method 200 comprising: step 202 of providing at least one interchangeable camera; step 204 of supporting at least one camera on at least one interchangeable camera stand that correlates to the camera; step 206 of adjusting at least one interchangeable camera against an interchangeable camera panel, wherein the camera lens is focused towards a user; step 208 of producing an image signal in an electronic media device; step 210 of reversing the image signal of the electronic media device with an internal mirror flip circuit to generate a reversed image to be displayed in a display screen; step 212 of projecting the reversed image from the display screen on to a beam splitter mirror that is then correctly oriented and readable and is disposed generally in front of the user, wherein the beam splitter mirror is configured to detachably and pivotally retain at a 45° angle relative to the screen when the mirror is moved from a flattened stowage position to an inclined operational position; step 214 of enclosing the beam splitter mirror and the display screen in a collapsible housing, wherein the housing is matted and black colored to minimize glare and reflections; step 216 of prompting the user to perform while using the correctly oriented and readable image displayed on the beam splitter mirror and simultaneously facing the camera; and step 218 of capturing video of the user by the camera, wherein the camera stand and the camera panel are interchangeable with respect to the camera, wherein lens hole size on the camera panel depends on the size of the camera lens and position of the camera.

In another aspect, the method 200 comprises a webcam 102a, whereby the webcam 102a is mounted in between the beam splitter mirror 112 and the camera panel 126a having no lens hole.

In another aspect, the method 200 comprises a camera 102b-c, wherein the camera 102b-c is a video camera, or a DSLR camera, or a camcorder, or a smart phone video camera, whereby the camera 102b-c is mounted behind the camera panel 126b-c having a lens hole 128 with respect to the size of the lens of the camera 102b-c.

Figure 2C:
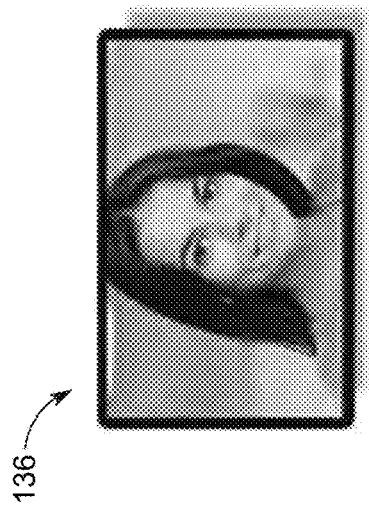
FIGS. 2A-2E illustrate perspective views of the media prompting assembly and the different possible uses, where
Figure 2E:
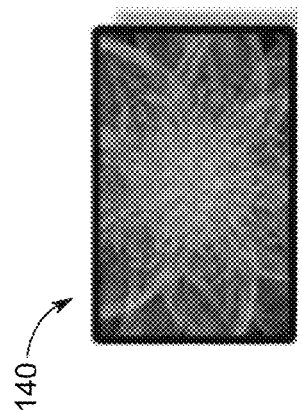
Figure 2A:
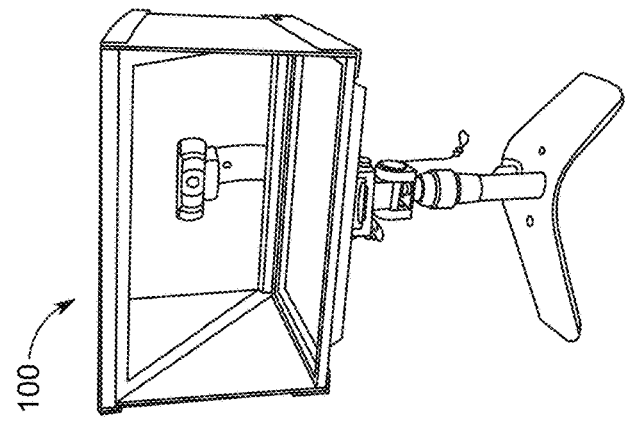

As referenced in FIGS. 1 and 2A, the assembly 100 comprises at least one camera 102a-c configured to capture video of a user or a group of users. The camera 102a-c is retained directly in front of the user, so that the user can look at the camera 102a-c while speaking or making a presentation. The assembly 100 is unique in that it enables eclectic types of cameras 102a-c to be interchangeably used, depending on the needs and media content of the user. In some embodiments, the camera 102a-c may include, without limitation, a webcam, a video camera, a DSLR camera, camcorder, and a smart phone video camera.

The assembly 100 also allows the user to interact with the camera 102a-c and the viewing mirror 112 in a variety of configurations and media presentations. This creates a flexible, portable assembly 100 that can be used for a myriad of media presentation and communication purposes.

In some embodiments, assembly 100 may also utilize at least one camera stand 104a-c to support at least one camera 102a-c (FIGS. 8A, 8B, 9A, 9B, 10A, and 10B). Each camera stand 104a-c correlates to its respective camera 102a-c. The camera stand 104b-c is adjustable in an up/down and in/out movement, so as to be operable with different camera 102b-c bodies and camera lens styles; however camera stand 104a is used for webcam type cameras in a fixed position disposed in the center between the beam splitter mirror 112 and the camera panel 102a. In one embodiment, the camera stand 104a-c is adjustable. Though any size or style of camera stand 104a-c may be used. A camera stand mounting bracket 158 may attach directly to the metal frame 144 of the monitor 106. This bracket 158 provides a mounting surface for the camera stand 104a-c.

Figure 2B:
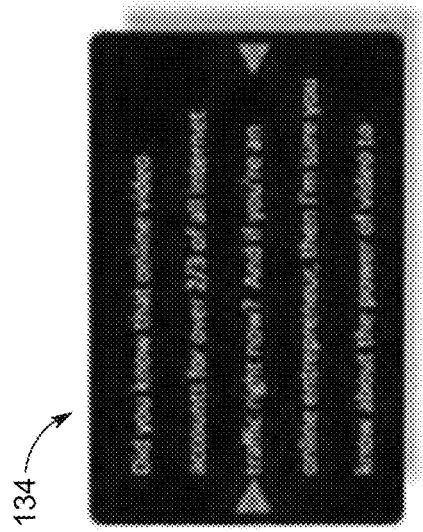

FIG. 2B references the assembly 100 being used, simply as a standard teleprompter 134. In this embodiment of the assembly 100, a beam splitter mirror 112 prompts the user with correctly oriented readable electronic visual text of a speech or script. The beam splitter mirror 112 is in front of the lens of the camera 102a-c, and the texts on the screen 110 are reflected to the eyes of the user using the beam splitter mirror 112. Light from the user passes through the front side of the mirror 112 into the camera lens, while a housing 122 encloses the screen 110, the mirror 112, and the camera lens to prevent unwanted light from entering the lens and reflect off the beam splitter mirror 112. Further, the housing 122 completely encloses all the way to the front of the screen 110 of the monitor 106 and the mirror 112, so as to minimize glare and reflection.

FIG. 2C references the assembly 100 being used as a video conferencing system 136 by the user to make direct contact with the eyes of an audience or individual. This is possible because the correctly oriented image of the audience or individual appears on the beam splitter mirror 112 directly in front of the camera 102 a-c. The assembly 100 creates the illusion that the user is looking directly at the audience or individual while simultaneously looking directly into the camera 102a-c.

Figure 2D:
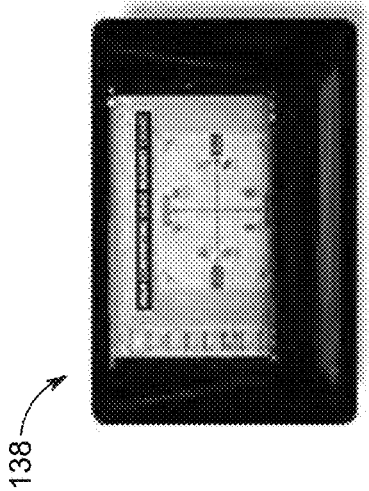

FIG. 2D references the assembly 100 allowing the user to view the correctly oriented computer screen 138 of a desktop computer or other media source while looking directly ahead. This allows the user to utilize the computer in a traditional manner even when the screen 110 is directly below the user. This is because the beam splitter mirror 112, directly in front of the user, reflects the correctly oriented readable image 152. Finally, FIG. 2E references the assembly 100 displaying a camera 102a-c entertainment image 140 that plays directly from the screen onto the beam splitter mirror 112 for viewing by the user as an exercise to develop improved performance as a user on camera. As in the other example, the user looks directly at the camera 102a-c lens while viewing the entertainment images 140.

As shown in FIG. 1, the housing 122, fully encloses the screen 110 to allow for greater clarity thereto, as glares from external lights are minimized. In one embodiment, screen 110 comprises a full HD (1920×1080) resolution 13.3" monitor. Monitor 106 may form at least one peripheral threaded hole 116 to enable attachment to at least one L-shaped support bracket 142.

Figure 3:
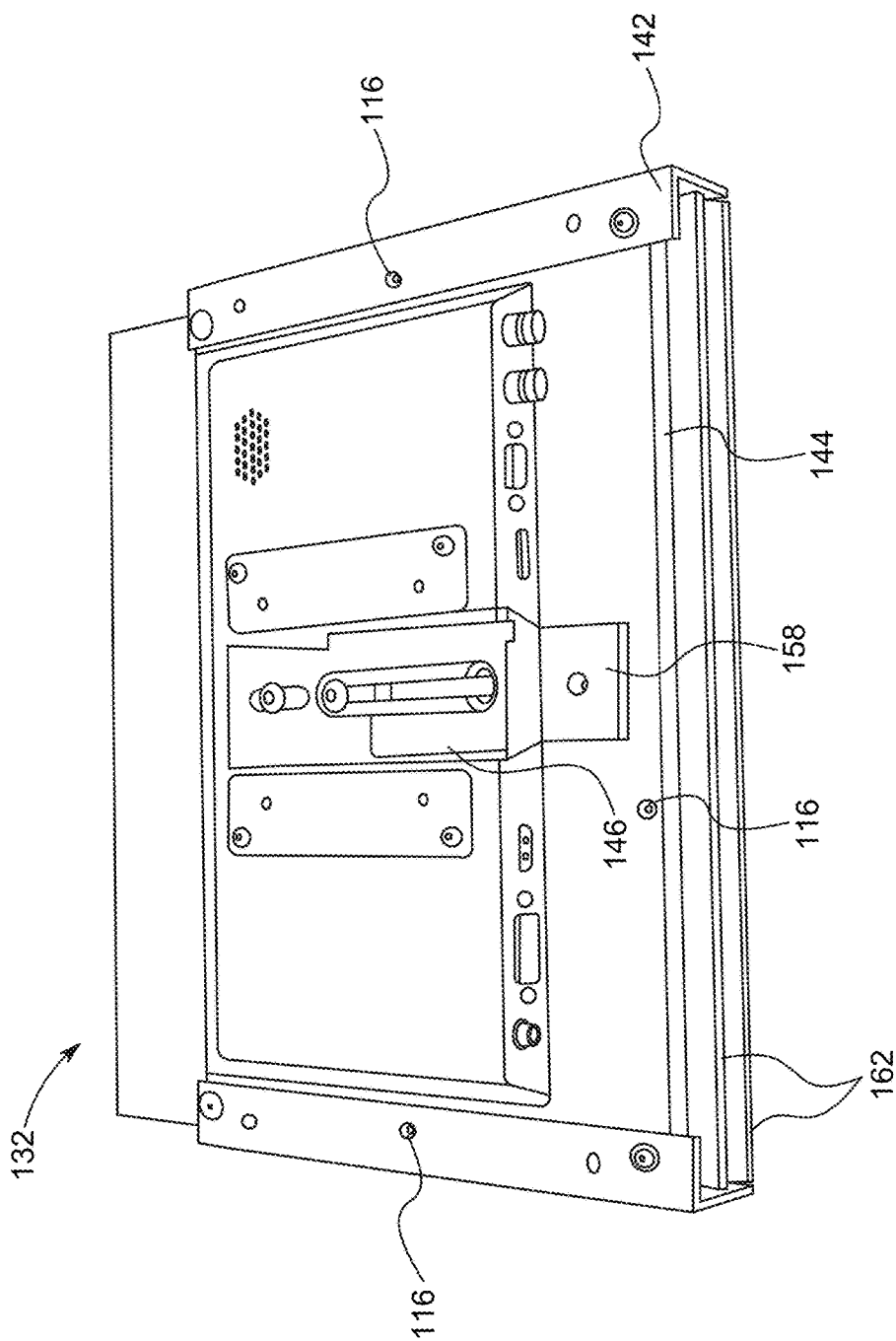
FIG. 3 illustrates a bottom view of an exemplary sliding quick release plate for a monitor, in accordance with an embodiment of the present invention.

Further, a sliding quick release plate 146 attaches to a back side of the monitor 106. The sliding quick release plate 146 allows monitor 106 to be easily removed from the stand 130 or tripod type support and folded into compact form for stowage with the other components of the assembly 100, as illustrated in FIG. 3. Assembly 100 includes a powder coated aluminum support bracket 142. The support bracket 142 screws into existing threaded holes in the metal frame 144 of the monitor 106. In one embodiment, the support bracket has a generally L-shaped bracket configuration. The L-shaped support bracket 142 while adding strength to the metal frame 144 of the monitor, allows the sidewall 124a, 124c to be erected in a vertical position, thereby facilitating quick formation or collapse of a housing 122 of the assembly 100.

Because the readable text input signal 150 can be scrolling, the monitor 106 may have integrated within, an internal mirror flip circuit 108 that creates a mirror image, or reversed image 151 of the generated image input signal 150. In one example, the internal mirror flip circuit 108 creates a mirror image of scrolling text, to facilitate reading when reflected on the beam splitter mirror 112.

Those skilled in the art will recognize that the capacity to reverse the image input signal 150 is a necessary option because many of the images are not scrolling text, and thus require the image to be reversed at the screen 110 so they appear correct and readable on the beam splitter mirror 112.

Figure 4:
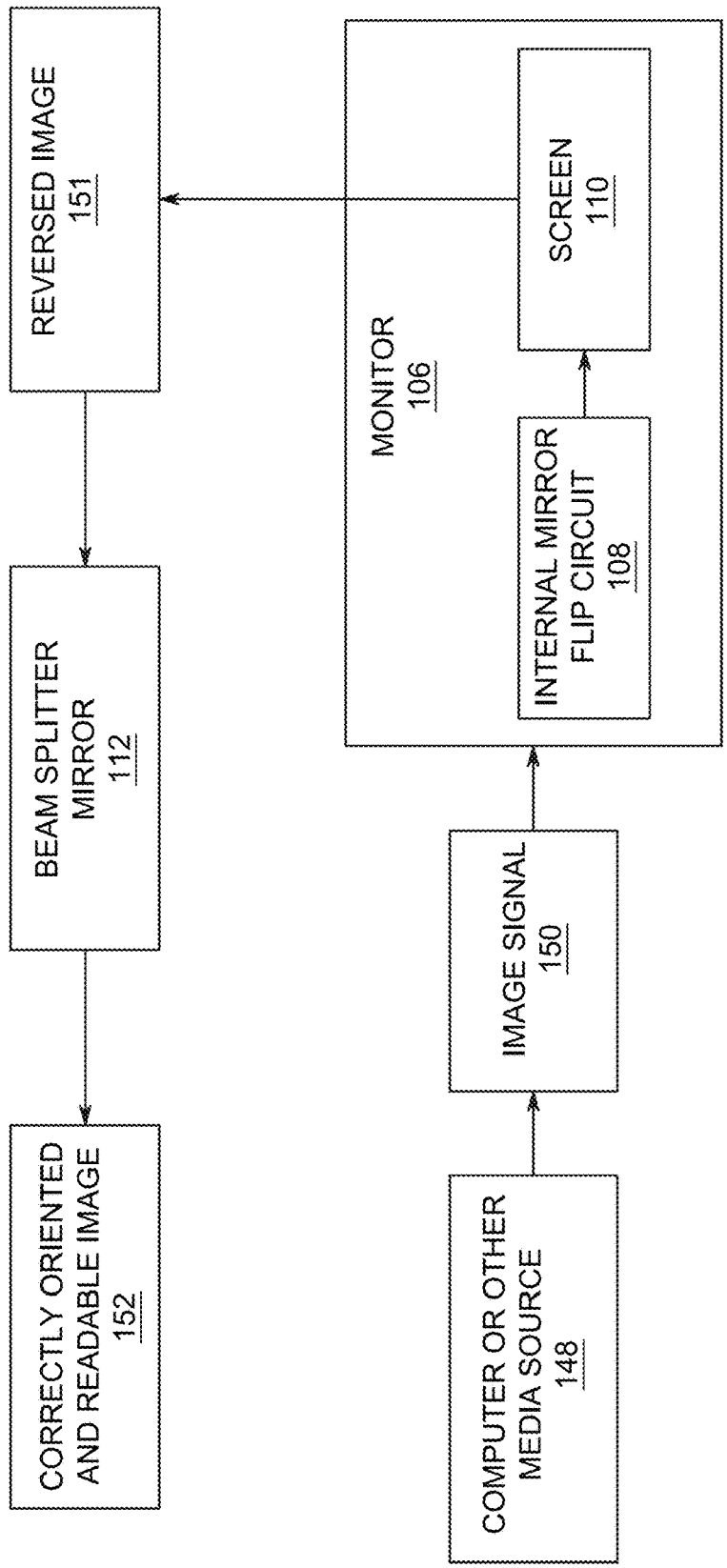
FIG. 4 illustrates a flow diagram of an exemplary image signal generated in an electronic media source and transmitted to an internal mirror flip circuit of the monitor, and then being converted to a reversed image on the screen and then projected onto the beam splitter mirror in a correctly oriented readable form, in accordance with an embodiment of the present invention.

FIG. 4 shows a diagram of the image signal 150 (text or graphics) generated in a computer or other electronic media device 148 and transmitting to the internal mirror flip circuit 108, and then being converted to a reversed image 151 on the screen 110. Once the reversed image 151 is reflected on the beam splitter mirror 112, the user can view the correctly oriented image in a readable form 152. In this illustration, the internal mirror flip circuit 108 operates substantially the same as an HDMI converter box known in the art.

Figure 5A:
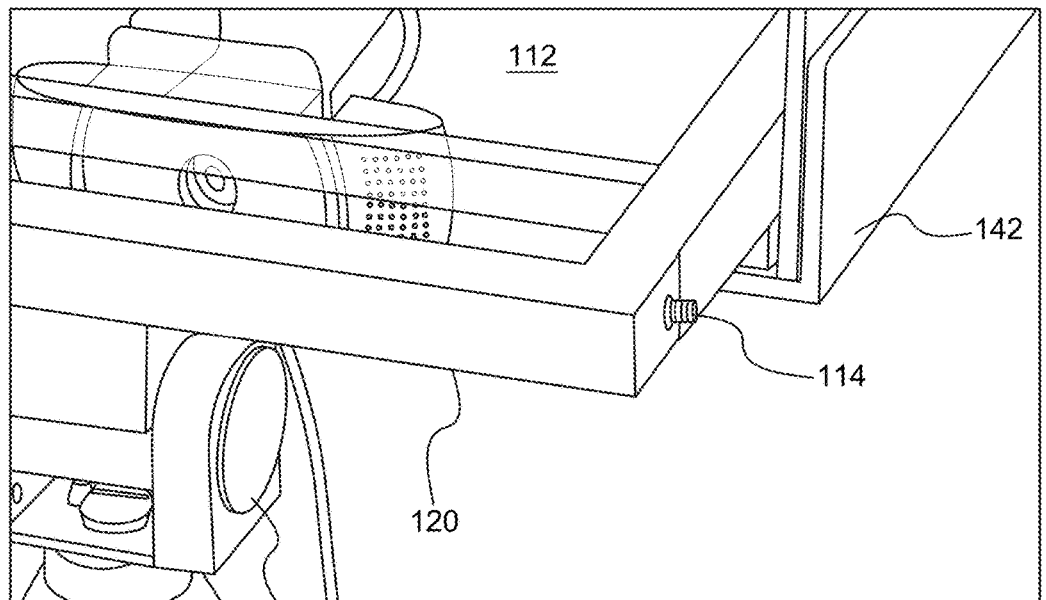
FIG. 5A illustrates a close up view of an exemplary set screw attached to the frame of the beam splitter mirror, in accordance with an embodiment of the present invention.
Figure 5B:
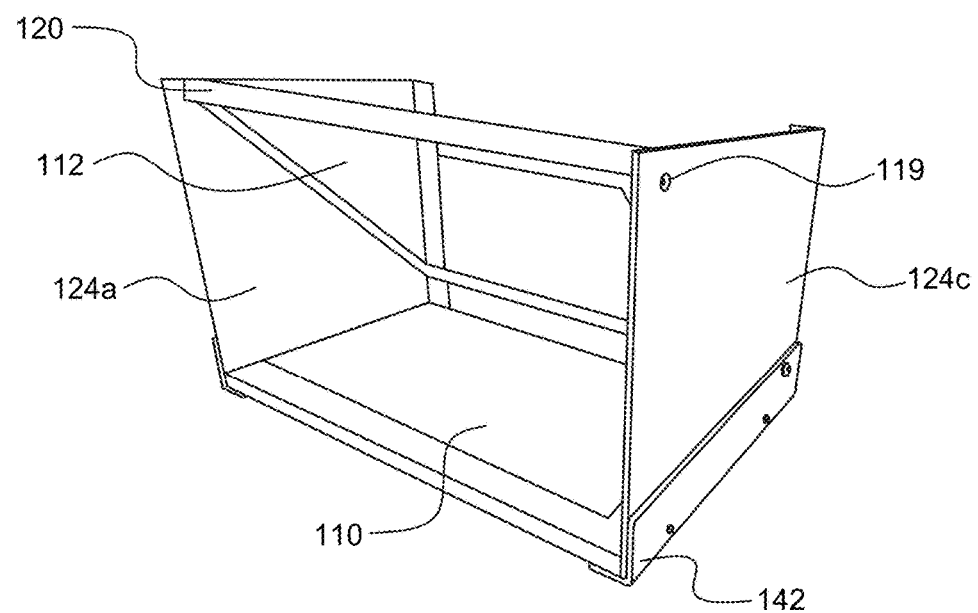
FIG. 5B illustrates a perspective view of an exemplary beam splitter mirror retained with the sidewalls at a predetermined angle relative to the screen, in accordance with an embodiment of the present invention.
Figure 6:
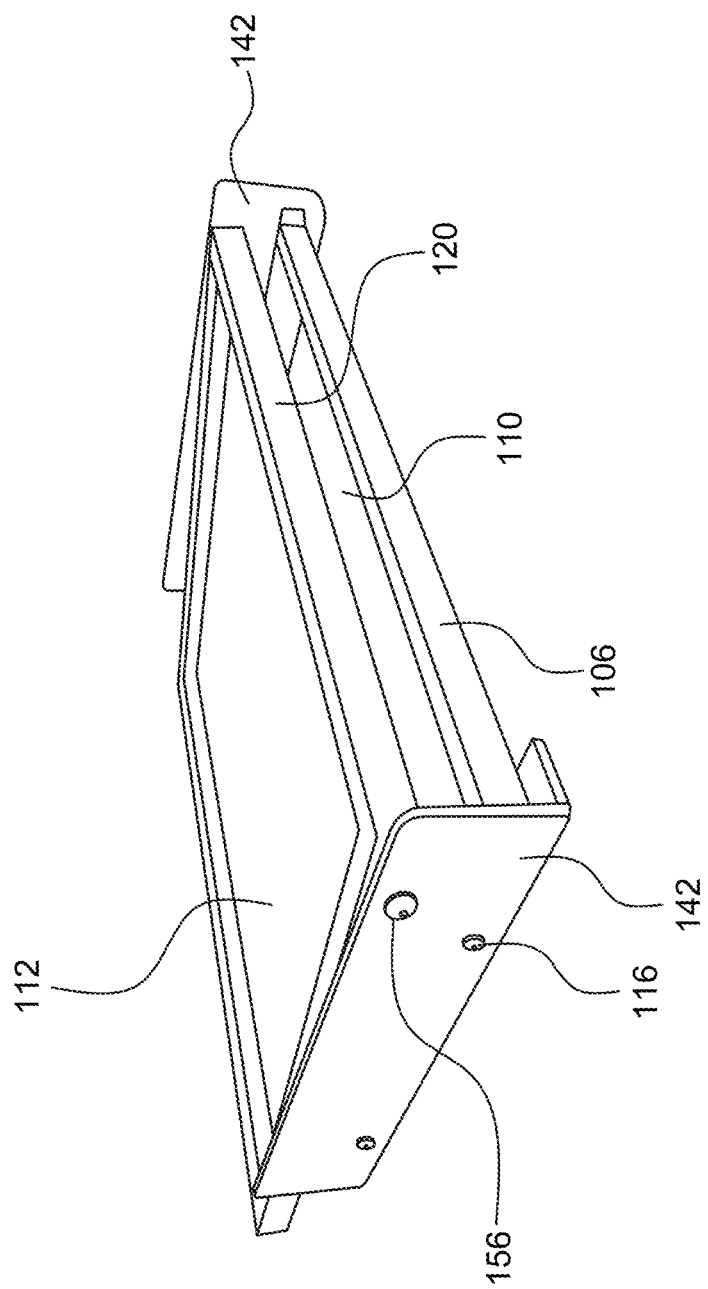
FIG. 6 illustrates a back perspective view of an exemplary L-shaped support bracket retaining a monitor, a housing, and a mirror, in accordance with an embodiment of the present invention.

Looking now at FIGS. 5A-B and 6, assembly 100 also utilizes a beam splitter mirror 112 to reflect the readable image 152 from the screen 110. The beam splitter mirror 112 is disposed at an angle relative to the screen 110. The angle of beam splitter mirror 112 may be about 45° when operational, and 0° when flattened for stowage. In one embodiment, beam splitter mirror 112 may include a dichroic mirror, a teleprompter mirror, a coated mirror, and a one-sided mirror. The housing 122, as described below, fully encloses the beam splitter mirror 112 to allow for greater clarity thereto, as glares from external lights are minimized.

As shown in FIG. 6, the mirror frame 120 is an integrated frame of the beam splitter mirror 112, wherein the mirror frame 120 protects the beam splitter mirror 112 and provides a framework for attaching mirror 112 to the monitor 106 by means of the L-shaped support bracket 142. The mirror frame 120 may be shaped substantially the same as the beam splitter mirror 112, surrounding the perimeter thereof. In one possible embodiment, the mirror frame 120 is constructed from picture frame material. In one embodiment, the mirror frame forms an L-shaped structure around the mirror perimeter.

In another embodiment shown in FIG. 5A, the mirror frame 120 is defined by at least one peripheral hole that receives a setscrew 114, or other fastening mechanism, to fasten the mirror frame 120 in a pivotal attachment to a peripheral hole in the upper region in at least one sidewall 124a, 124c, thereby allowing the beam splitter mirror 112 to pivotally hinge about the pivot point 156. In one embodiment, the screw is a nylon set screw (used as a locating pin) at the front of the mirror frame 120. Further, the beam splitter mirror 112 is detachably retained to the top region of the at least one sidewall 124a, 124c, so as to position the beam splitter mirror 112 inclined at 45 degrees to the screen 110 of the assembly 100 as shown in FIG. 5B. The mirror frame positioning system allows for easy assembly of the beam splitter mirror 112 to exactly 45 degrees or to other desired angle of inclination and then quickly stowing the mirror as needed. According to an embodiment of the present invention, to assemble the beam splitter mirror 112, it is raised and the nylon set screws 114 at the front end of the mirror frame 120 drop into the laser cut holes 119 at the top ends of the sidewalls 124a, 124c. Similarly for stowing the mirror 112, the set screws 114 are pulled out from the holes 119 at the top ends of the sidewalls 124a, 124c by spreading the sidewalls 124a, 124c slightly apart from each other, then slowly pivoting the mirror 112 through the hinge joint of the pivot point 156 (not shown) to a horizontal stowed position. The beam splitter mirror 112 is configured to reflect the readable image 152 from the screen 110 for viewing, whereby the readable image 152 is readable when reflected on the beam splitter mirror 112.

Looking back at FIG. 1, a housing 122 is used to protect camera 102a, the screen 110, and the beam splitter mirror 112 from physical damage and glare from external lights. The housing 122 may include at least one left sidewall 124a, top sidewall 124b, a right sidewall 124c and a camera panel 126a-c that fit together to form a protective housing 122. The at least one sidewall 124a-c and the camera panel 126a are matted and fabricated from acrylic preferably black colored, wherein the black acrylic has a matt finish on both sides so as to minimize glare from external lights and reflection in the inner side of the enclosure 122 and prevent finger prints and hide dust at the outside surface of the side walls 124a-c.

Figure 7:
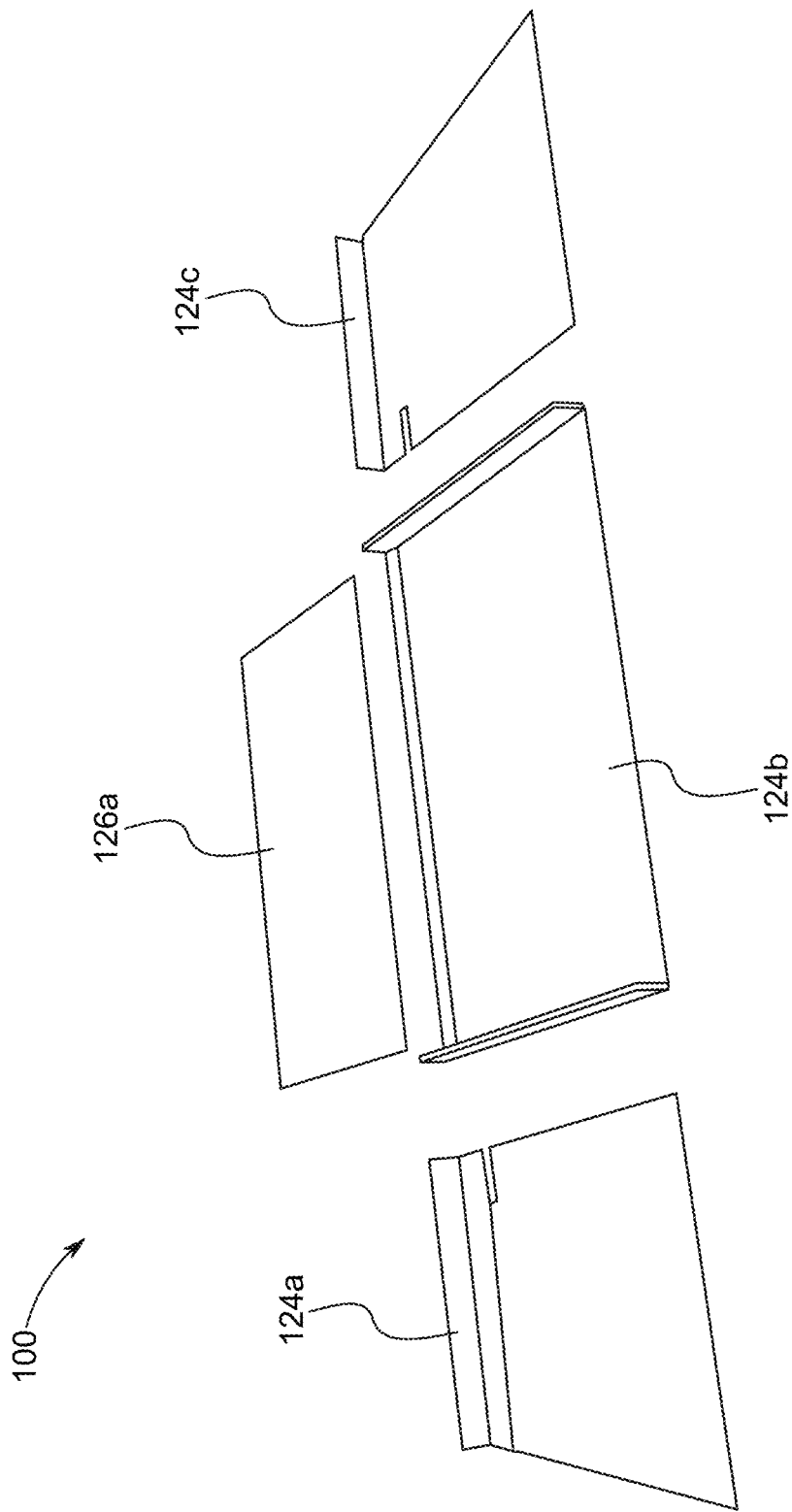
FIG. 7 illustrates a exploded view of an exemplary housing, showing sidewalls and a camera panel, in accordance with an embodiment of the present invention.

FIG. 7 illustrates a four piece set of laser cut and heat bent sidewalls 124a-c and camera panel 126a. In this example, a left sidewall 124a, a top sidewall 124b, and a right sidewall 124c mate with the camera panel 126a to form a generally cuboid shape with an open face. In this embodiment, camera panel 126a does not form a lens hole 128. Though other camera panels 126b-c may be used with the sidewalls 124a-c that does, indeed form a lens hole 128 of varying sizes and shapes.

In some embodiments, the sidewall 124a-c is sized and dimensioned to enclose the screen 110 and the beam splitter mirror 112. Furthermore, at least one sidewall 124a-c adjustably retains the mirror frame 120 at the angle relative to the screen 110. The camera panel 126a-c is disposed to form a back side of the housing 122, attaching to the at least one sidewall to form a cuboid having an open face.

The camera panel 126b-c may be defined by a lens hole 128 positioned and sized for enabling operation of the at least one camera 102b-c. In this manner, multiple camera panels 126b-c can be interchanged in the housing 122 to accommodate multiple cameras 102b-c that are operational with the lens hole 128 in the camera panel 126b-c. The dimensions of the camera panel 126a-c remain substantially the same; but it is the lens hole 128 that changes in dimensions, shapes, and location on the camera panel 126a-c—or is not even used—that determines the correlation of camera panel 126a-c to camera 102a-c. Thus it is necessary to correlate corresponding cameras to camera panels to operate the assembly 100.

Figure 8A:
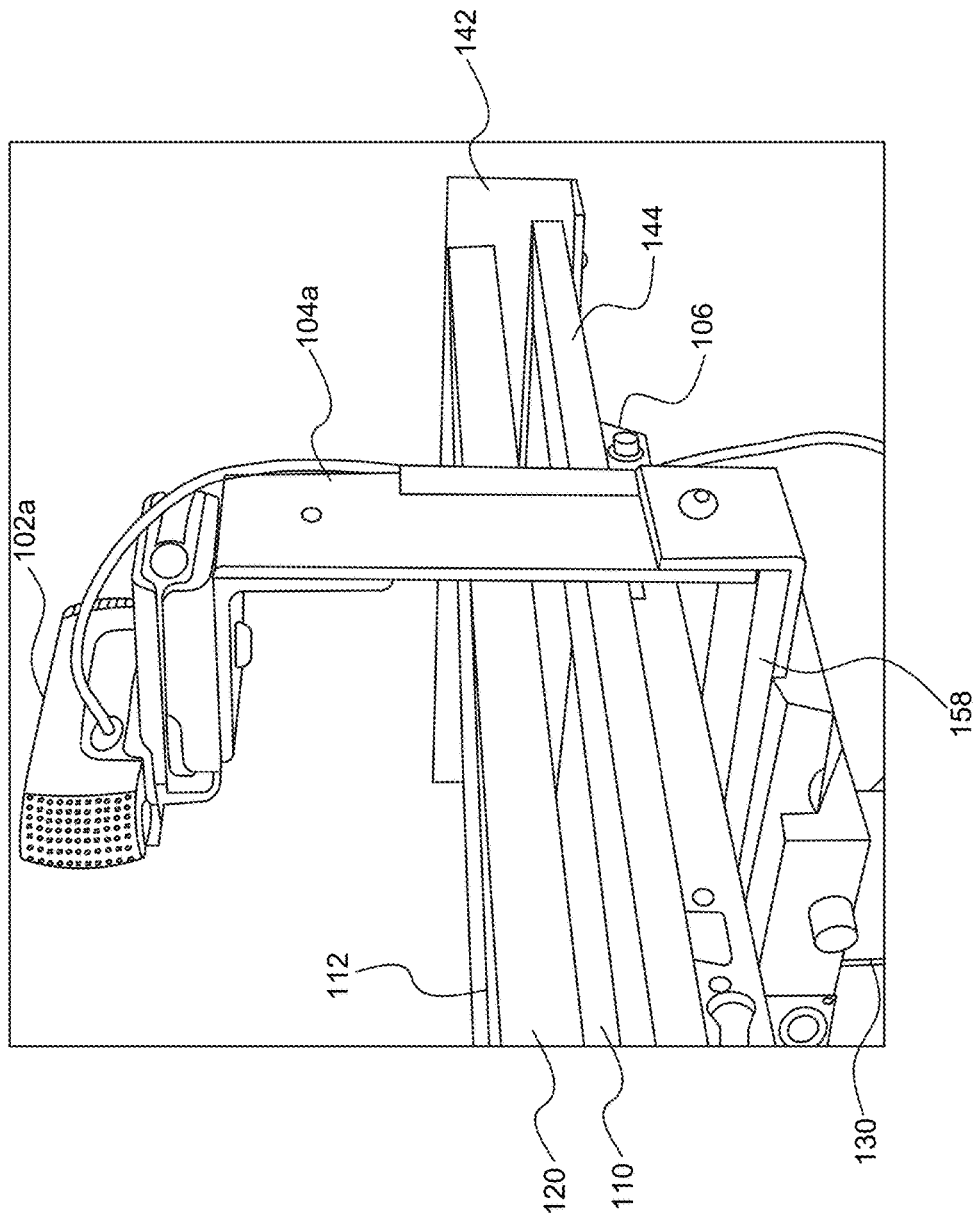

For example, as shown in FIG. 8A, a Logitech c920 HD webcam 102a is retained with a camera stand 104a in front of a camera panel 126a. For the webcam embodiment, the camera panel 126a has no lens hole 128, as referenced in FIG. 8B. The camera stand 104a raises the webcam in front of the camera panel 126a and in alignment with the beam splitter mirror 112. The webcam 102a may be connected to the computer as well as using a microphone (such as Blue Yeti or Snowball) connected to the computer as the webcam microphone cannot be used as it is enclosed behind the mirror 112.

Figure 9A:
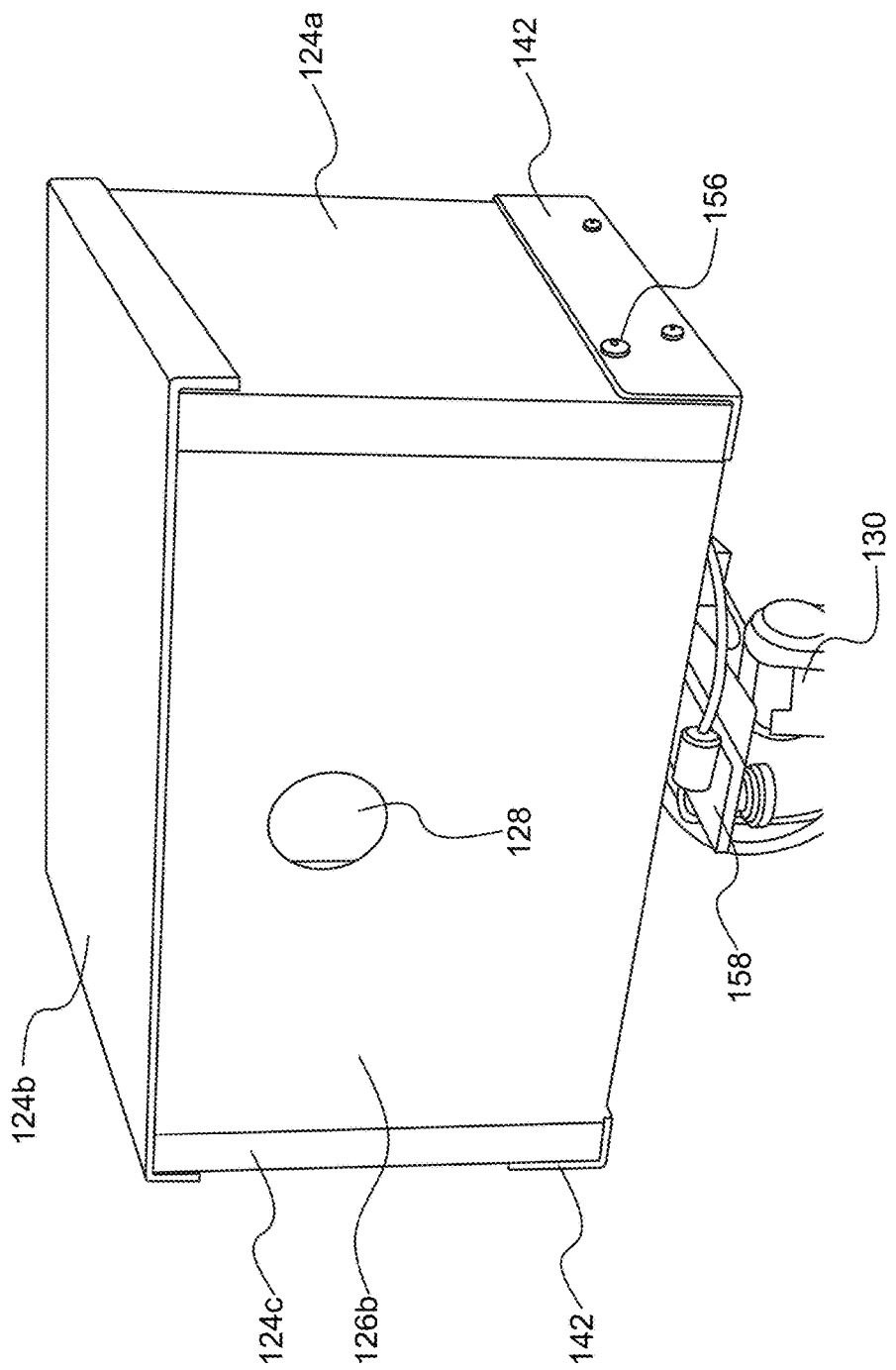
FIGS. 9A and 9B illustrate perspective views of an exemplary video camera/DSLR, where
Figure 9B:
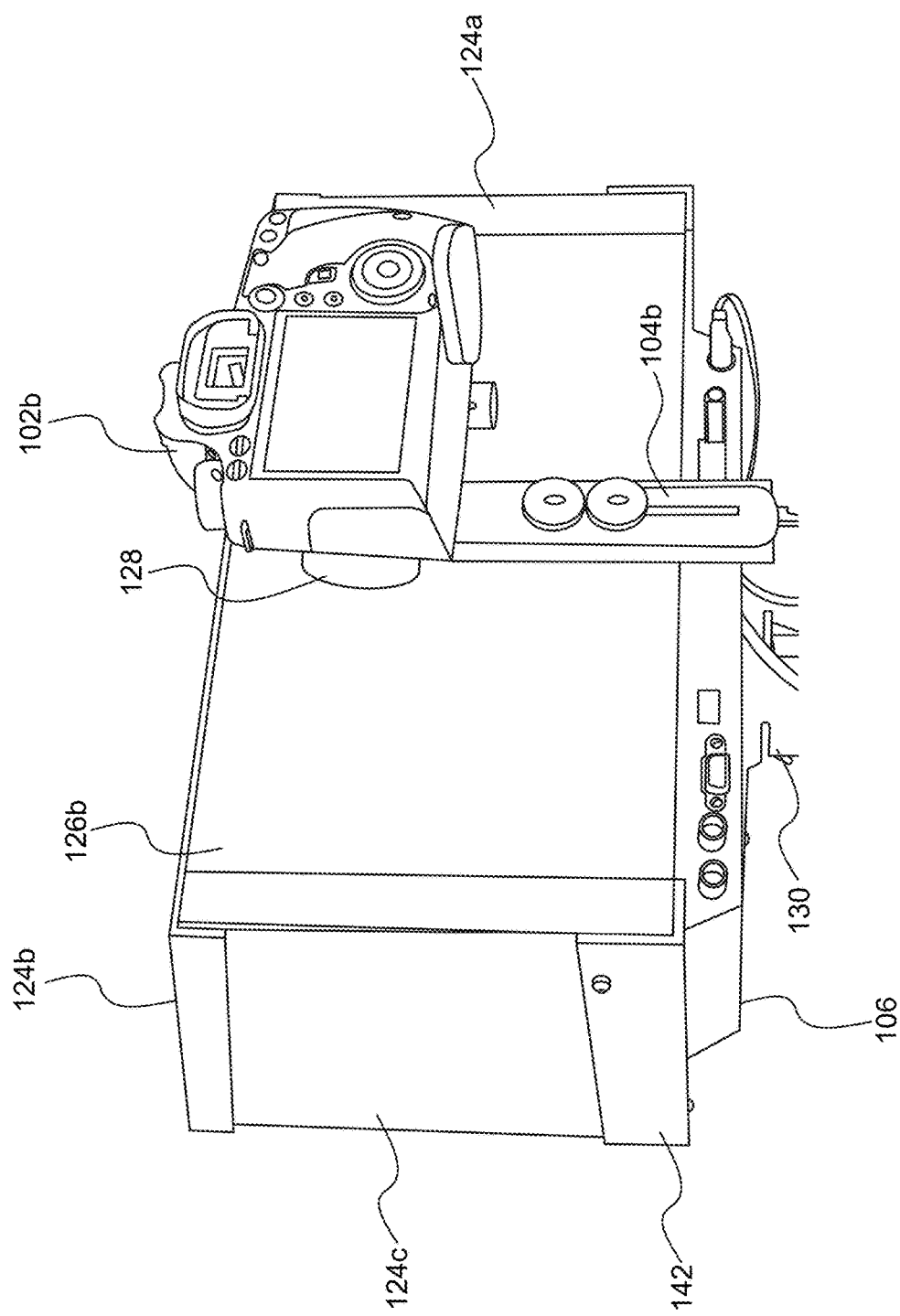

In another exemplary embodiment a video camera/DSLR 102b shown in FIG. 9A-B, is retained with a camera stand 104b against a camera panel 126b that has a centrally located lens hole 128 so that the line of sight is level with the center of the beam splitter mirror 112 (FIG. 9A). The Video Camera/DSLR Camera mount/stand 104b is outside of the camera panel 126b of the housing 122 (FIG. 9B). The camera stand 104b provides for up/down and in/out adjustment to work with different camera bodies and lens styles. An external microphone may be connected to the camera 102b for receiving sound input. Similar to video camera/DSLR 102b, camcorders or the like may be mounted to the camera panel 126b that has a centrally located lens hole 128.

Figure 10A:
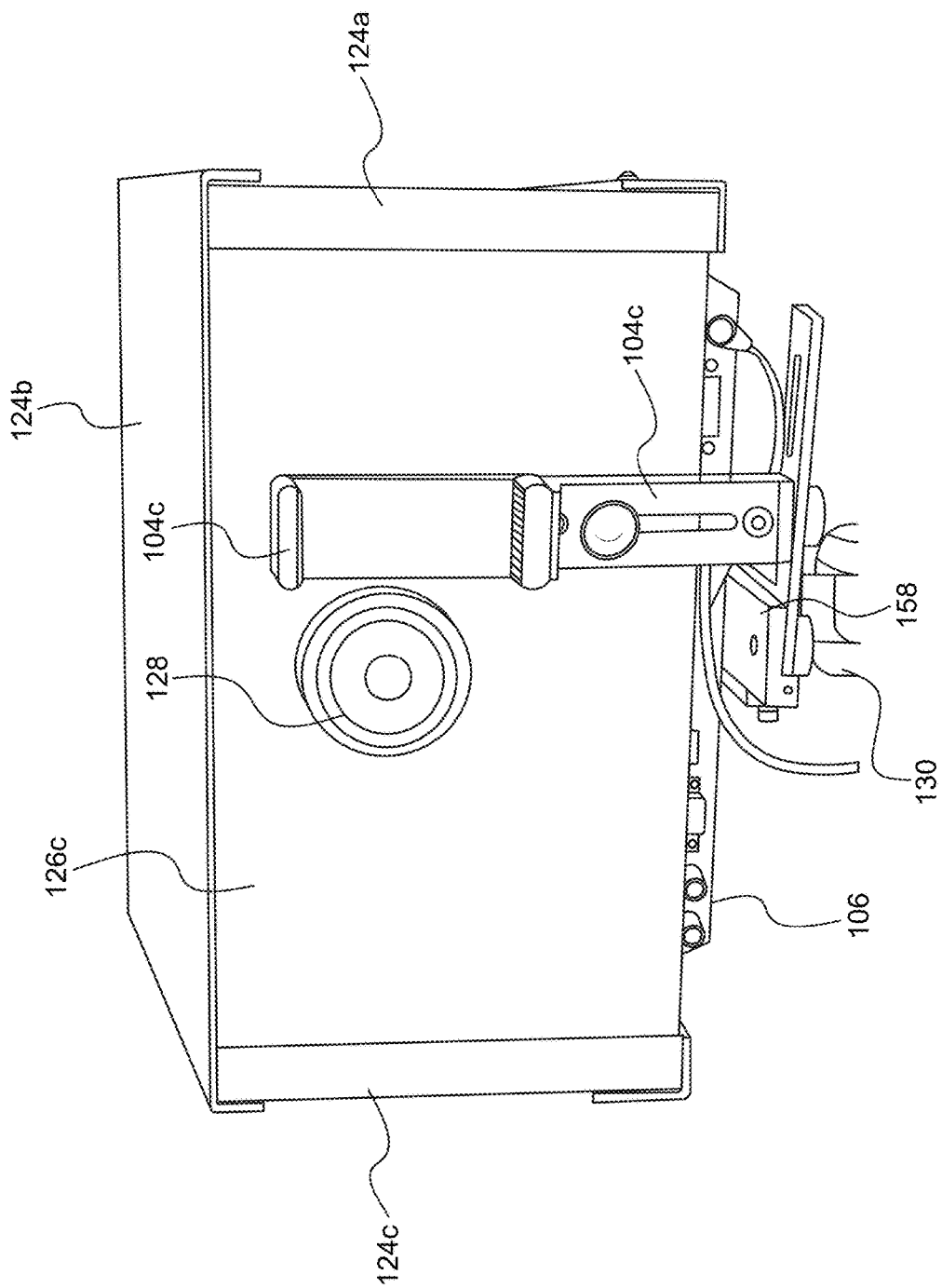
FIGS. 10A and 10B illustrate perspective views of an exemplary smartphone camera, where
Figure 10B:
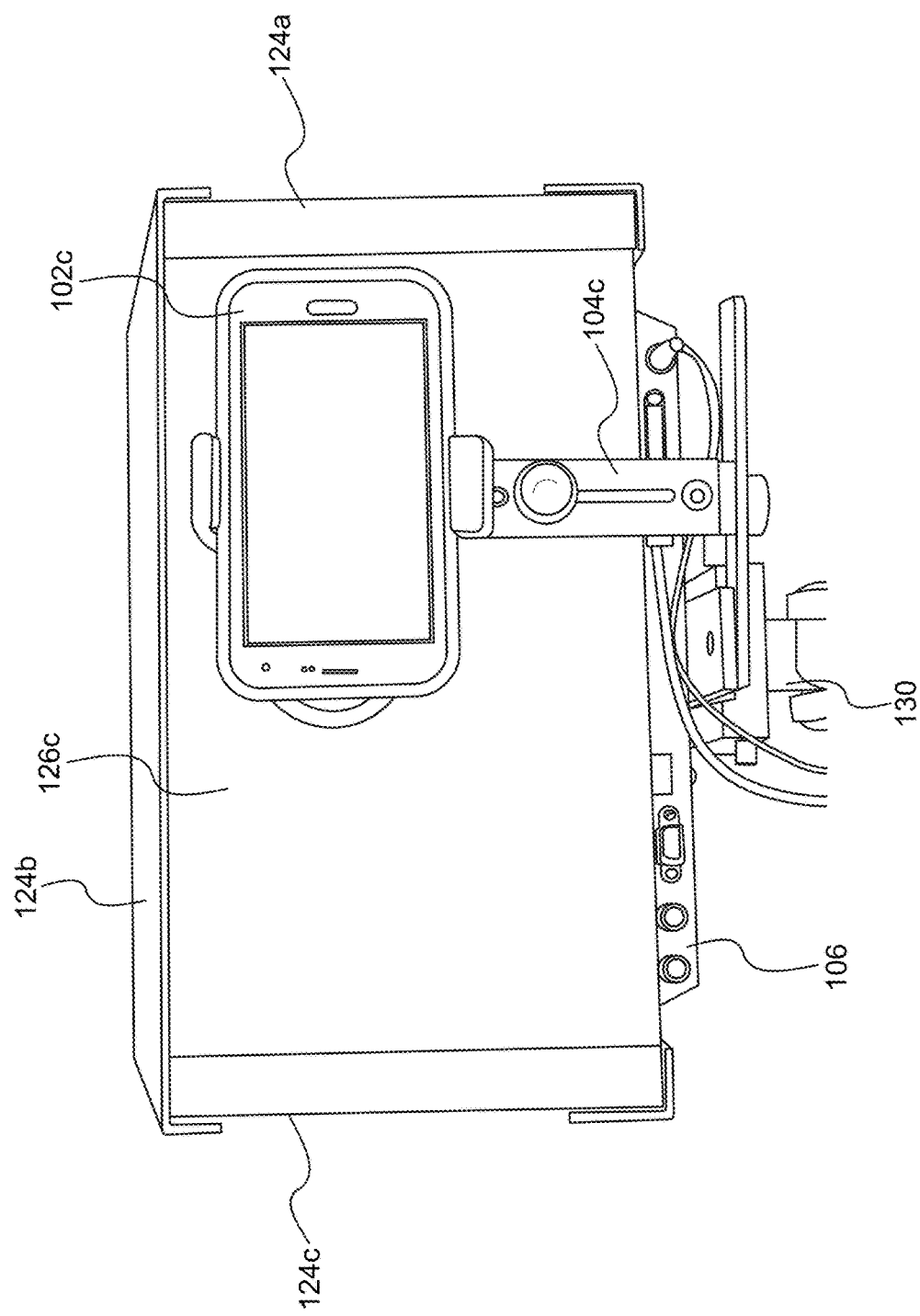

In yet another example shown in FIG. 10A-B, a smart phone camera 102c is operable with a camera panel 126c that is defined by a protruding lens hole. The protruding lens hole allows for the space taken by the camera stand 104c behind the camera panel 126c. In this manner, the phone/lens of the smart phone camera 102c aligns correctly with the surface of the protruding lens hole 128 (FIG. 10B). The hole 128 in the camera panel 126c is large enough so that the edges of the hole 128 will not get in the way and show up in the video, as long as the lens is centered in the hole and the camera surface is right up against the camera panel 126c. The camera stand (phone mount) 104c has a standard clamp type phone holder and the required adjustability to mount a wide variety of smart phones. An external microphone may be plugged to the smart phone 102b for receiving sound input.

Thus, by simply switching camera panels 126a-c, camera stands 104a-c, and cameras 102a-c, it is possible to switch from a webinar using the webcam, to a Facebook live using a smart phone, and further mount the assembly 100 on a tripod and record with a video camera. In essence, one of each of the camera 102a-c, the camera stands 104a-c, and the camera panel 126a-c correlate. And further, each correlating group of camera 102a-c, camera stand 104a-c, and camera panel 126a-c are interchangeable with another correlating group of camera 102a-c, camera stand 104a-c, and camera panel 126a-c.

As FIG. 3 shows, assembly 100 is collapsible and in one embodiment has attached to the bottom of the monitor 106 a quick release plate 146 and a camera stand mounting bracket 158. With the housing 122 removed from the monitor 106 and beam splitter mirror 112, the assembly 100 collapses to an easily transported package only about 3" thick. The beam splitter mirror 112, while in the mirror frame 120, is protected by foam core pads 162 in this flat, collapsed position. The overall size of the assembly 100 in the collapsed position is about 13.5" wide by 12" deep.

Looking now at FIG. 11, a desktop stand 130 may be used to support the assembly 100 on a desktop. In this manner, the assembly 100 may be operable while the user is sitting at a desk and working on different affairs. In one embodiment, the desktop stand 130 has a quick release mounting bracket 118 for securing the bottom of the monitor 106 thereto through the quick release plate 146, and a base 154 of the desktop stand 130 for supporting the weight of the assembly 100. In some embodiments, the desktop stand 130 may include a modified LCD monitor stand.

Through use of the desktop stand 130, the assembly 100 may be used as an extended desktop monitor to show anything on a computer screen 110, correctly oriented, as a virtual image directly in front of the camera 102a-c. This is helpful for allowing the user to make eye contact while performing video calls or running a real time webinar.

Figure 12:
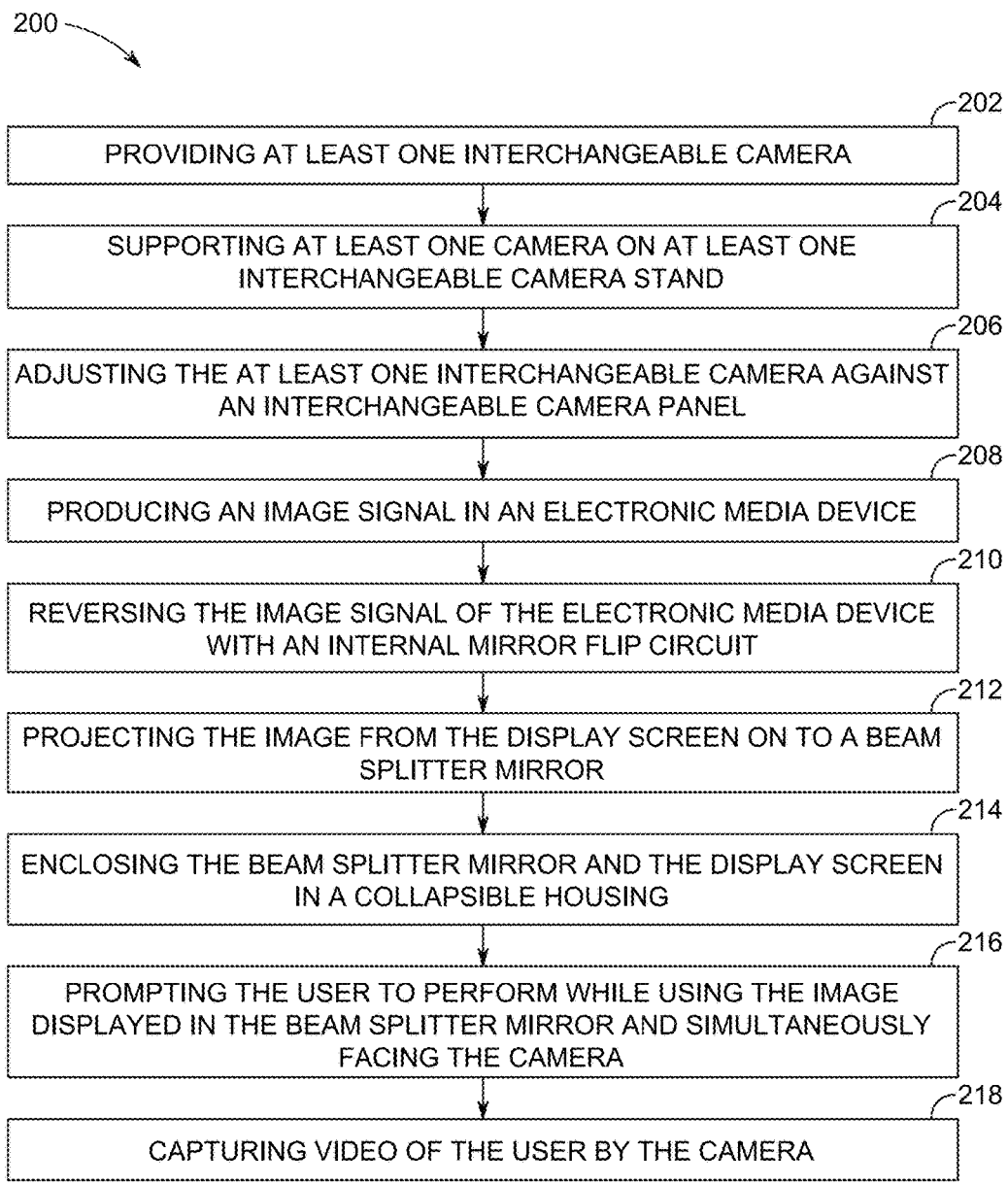
FIG. 12 illustrates a flowchart diagram of an exemplary method for prompting, in accordance with an embodiment of the present invention.

FIG. 12 illustrates a flowchart diagram of an exemplary method 200 for prompting with a media prompting assembly. The method 200 may include an initial Step 202 of providing at least one interchangeable camera 102a-c. The method 200 may further comprise a Step 204 of supporting at least one camera 102a-c on at least one interchangeable camera stand 104a-c that correlates to the camera 102a-c. A Step 206 includes adjusting the at least one interchangeable camera 102a-c against an interchangeable camera panel 126a-c, wherein the camera lens is focused towards a user.

In some embodiments, a Step 208 comprises producing an image signal 150 in an electronic media device 148. A Step 210 includes reversing the image signal 150 of the electronic media device 148 with an internal mirror flip circuit 108 to generate a reversed image to be displayed in a display screen 110. In some embodiments, a Step 212 may include projecting the reversed image 151 from the display screen 110 on to a beam splitter mirror 112 that is correctly oriented and readable and is disposed generally in front of the user, wherein the beam splitter mirror 112 is configured to detachably and pivotally retain at a 45° angle relative to the screen 110 when the mirror 112 is moved from a flattened stowage position to an inclined operational position. A Step 214 comprises enclosing the beam splitter mirror 112 and the display screen 110 in a collapsible housing 122, wherein the housing 122 is matted and black colored to minimize glare and reflections.

Yet another Step 216 includes prompting the user to perform while using the readable image 152 displayed on the beam splitter mirror 112 and simultaneously facing the camera 102a-c. A final Step 218 includes capturing video of the user by the camera 102a-c, wherein the camera stand 104a-c and the camera panel 126a-c are interchangeable with respect to the camera 102a-c, wherein the size of the lens hole on the camera panel 126a-c depends on the size of the camera lens and position of the camera 102a-c.

In one exemplary use of the assembly 100, a user stands directly in front of a camera 102a-c and a beam splitter mirror 112 that are housed in a housing 122. A screen 110 projects a readable image 152 of text, indicia, or images onto the beam splitter mirror 112, directly in front of the user. The readable image is correctly oriented through use of an internal mirror flip circuit 108, and in full HD resolution and with minimal reflections/glare from external lighting.

Because the beam splitter mirror 112 is in front of the camera 102a-c, the user can view the readable image 152 while looking directly at the camera 102a-c. The viewed image 152 may be a person on the other end of a video call, a webinar, a slide presentation, or a teleprompter script. The resultant teleprompting and communication experience is greater engagement and ease of connection, which leads to increased client attraction, conversion, and retention.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A media prompting assembly comprising:
a monitor configured to receive an image signal from an electronic device, further the monitor is supported by a frame;
a beam splitter mirror, wherein the beam splitter mirror is configured to pivotally attach to the frame of the monitor;
a housing comprising a left sidewall, a top sidewall, and a right sidewall mating with an interchangeable camera panel to form the housing with an open face, whereby the housing is mated and configured to enclose the monitor and the beam splitter mirror, further the housing is configured to detachably and pivotally retain the beam splitter mirror at a predetermined angle relative to the screen;
a camera stand mounting bracket attached to the frame of the monitor, wherein the camera stand mounting bracket provides a mounting surface for an interchangeable adjustable camera stand; and
at least one camera to be interchangeably used and retained with the camera stand, whereby the camera is positioned behind the center of the beam splitter mirror while facing the user, the camera stand and the camera panel are interchangeable with respect to the camera, wherein lens hole size on the camera panel depends on the size of the camera lens and position of the camera,
whereby the monitor comprising a screen and an internal mirror flip circuit that creates a mirror image of the received image signal that is projected on the screen to create a reversed image, which is readable when reflected on the beam splitter mirror, thereby directly displaying the readable image in front of the user for viewing, simultaneously allowing the camera to capture video of the user.

2. The assembly of claim 1, wherein the assembly further comprises a height adjustable stand having a quick release mounting bracket for securing to a quick release plate attached to the frame of the monitor, so as to support the assembly in a desired position.

3. The assembly of claim 1, wherein the at least one camera is selected from the group consisting of a webcam, a video camera, a DSLR camera, a camcorder, and a smart phone video camera.

4. The assembly of claim 1, wherein the predetermined angle of the beam splitter mirror relative to the screen is 45° when the mirror is moved from a flattened stowage position to an inclined operational position.

5. The assembly of claim 1, wherein the housing is constructed from laser cut and heat bent acrylic sheets, which are mated and black colored to minimize glare and reflections.

6. The assembly of claim 1, wherein the beam splitter mirror is selected from the group consisting of a dichroic mirror, a teleprompter mirror, a coated mirror, and a one-sided mirror.

7. The assembly of claim 1, wherein the assembly further comprises an external microphone for receiving sound input.

8. A media prompting assembly comprising:
a monitor configured to receive an image signal from an electronic device, further a metal frame encloses at least left side, right side and bottom surfaces of the monitor;
one or more L-shaped support brackets attached to the metal frame of the monitor, wherein the L-shaped support brackets are configured to run parallel to the left side and the right side surfaces of the monitor;
a beam splitter mirror, wherein a mirror frame protects the beam splitter mirror and provides a framework for pivotally attaching mirror to the monitor by means of the L-shaped support bracket;
a housing comprising a left sidewall, a top sidewall, and a right sidewall mated with an interchangeable camera panel to form a generally cuboid shape with an open face, whereby the housing is matted and configured to enclose the screen and the beam splitter mirror, the left sidewall and the right sidewall are detachably attached in a vertical position to the L-shaped support brackets, further the left sidewall and the right sidewall are configured to detachably and pivotally retain the beam splitter mirror at a 45° angle relative to the screen when the mirror is moved from a flattened stowage position to an inclined operational position;
a height adjustable stand having a quick release mounting bracket for securing to a quick release plate attached to the metal frame of the monitor, so as to support the assembly in a desired position;
a camera stand mounting bracket attaches to the metal frame of the monitor, wherein the camera stand mounting bracket provides a mounting surface for an interchangeable adjustable camera stand; and
at least one camera to be interchangeably used and retained with the camera stand, whereby the camera is positioned behind the center of the beam splitter mirror while facing the user, the camera stand and the camera panel are interchangeable with respect to the camera, wherein the lens hole size on the camera panel depends on the size of the camera lens and position of the camera,
whereby the monitor comprising a screen and an internal mirror flip circuit that creates a mirror image of the received image signal that is projected on the screen to create a reversed image, which is readable when reflected on the beam splitter mirror disposed at a predetermined angle relative to the screen, thereby directly displaying the correctly oriented readable image in front of the user for viewing, simultaneously allowing the camera to capture video of the user.

9. The assembly of claim 8, wherein the at least one camera is selected from the group consisting of a webcam, a video camera, a DSLR camera, a camcorder and a smart phone video camera.

10. The assembly of claim 8, wherein the at least one camera stand is selected from the group correlating to the at least one camera.

11. The assembly of claim 8, wherein the screen of the monitor comprises a full HD (1920×1080) resolution 13.3" monitor.

12. The assembly of claim 8, wherein the housing is constructed from laser cut and heat bent acrylic sheets, which are matted and black colored to minimize glare and reflections.

13. The assembly of claim 8, wherein the beam splitter mirror is selected from the group consisting of a dichroic mirror, a teleprompter mirror, a coated mirror, and a one-sided mirror.

14. The assembly of claim 8, wherein the assembly is configured to collapses to a package of about 3 inch thick, 13.5 inch wide by 12 inch deep.

15. The assembly of claim 8, wherein the mirror frame is protected by foam core pads during stowage in the flat, collapsed position.

16. The assembly of claim 8, wherein the assembly further comprises an external microphone for receiving sound input.

17. A method for prompting with a media prompting assembly, the method comprising:
   providing at least one interchangeable camera;
   supporting at least one camera on at least one interchangeable camera stand that connects to the camera;
   adjusting the at least one interchangeable camera against an interchangeable camera panel, wherein the camera lens is focused towards a user;
   producing an image signal in an electronic media device;
   reversing the image signal of the electronic media device with an internal mirror flip circuit to generate a reversed image to be displayed on a display screen;
   projecting the reversed image from the display screen on to a beam splitter mirror that is correctly oriented and readable and is disposed generally in front of the user, wherein the beam splitter mirror is configured to detachably and pivotally retain at a 45° angle relative to the screen when the mirror is moved from a flattened stowage position to an inclined operational position;
   enclosing the beam splitter mirror and the display screen in a collapsible housing, wherein the housing is matted and black colored to minimize glare and reflections;
   prompting the user to perform while using the readable image displayed on the beam splitter mirror and simultaneously facing the camera; and
   capturing video of the user by the camera, wherein the camera stand and the camera panel are interchangeable with respect to the camera, wherein lens hole size on the camera panel depends on the size of the camera lens and position of the camera.

18. The method of claim 17, wherein the camera is a webcam, whereby the webcam is mounted in between the beam splitter mirror and the camera panel having no lens hole.

19. The method of claim 17, wherein the camera is a video camera or a DSLR camera or a smart phone video camera or a camcorder, whereby the camera is mounted behind the camera panel having a lens hole with respect to the size of the lens of the camera.

20. The method of claim 17, wherein the assembly is configured to collapses to a package of about 3 inch thick, 13.5 inch wide by 12 inch deep.

\* \* \* \* \*